United States Patent
Abdel Shahid et al.

(10) Patent No.: US 11,546,915 B2
(45) Date of Patent: Jan. 3, 2023

(54) SELECTING WIRELESS BAND TO USE

(71) Applicant: T-Mobile USA, Inc., Bellevue, WA (US)

(72) Inventors: Wafik Abdel Shahid, Kenmore, WA (US); Ming Shan Kwok, Seattle, WA (US); Nishant Patel, Irvine, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 101 days.

(21) Appl. No.: 16/989,636

(22) Filed: Aug. 10, 2020

(65) Prior Publication Data

US 2022/0046649 A1 Feb. 10, 2022

(51) Int. Cl.
*H04W 72/04* (2009.01)
*H04L 5/00* (2006.01)
*H04W 64/00* (2009.01)

(52) U.S. Cl.
CPC ....... *H04W 72/0493* (2013.01); *H04L 5/0092* (2013.01); *H04W 64/003* (2013.01); *H04W 72/0453* (2013.01)

(58) Field of Classification Search
CPC ........... H04W 72/0493; H04W 64/003; H04W 72/0453; H04L 5/0092
See application file for complete search history.

(56) References Cited

U.S. PATENT DOCUMENTS

| | | | | |
|---|---|---|---|---|
| 11,153,762 B1* | 10/2021 | Routt | ................ | H04W 72/082 |
| 11,166,153 B1* | 11/2021 | Carames | ........... | H04W 36/0022 |
| 2009/0124224 A1 | 5/2009 | Hildebrand et al. | | |
| 2017/0215135 A1 | 7/2017 | Lau | | |
| 2019/0053175 A1* | 2/2019 | Kubota | ................ | H04W 16/14 |
| 2019/0141783 A1* | 5/2019 | Malik | ..................... | H04W 8/24 |
| 2019/0208549 A1* | 7/2019 | Zhang | .................... | H04W 16/14 |
| 2019/0261258 A1* | 8/2019 | Lindoff | ................ | H04W 88/06 |
| 2019/0387464 A1 | 12/2019 | Abdel Shahid | | |
| 2020/0314861 A1* | 10/2020 | Goel | .................... | H04W 40/246 |
| 2021/0045044 A1* | 2/2021 | Tran | ..................... | H04W 48/18 |
| 2021/0084576 A1* | 3/2021 | Zhu | ...................... | H04W 48/20 |

(Continued)

FOREIGN PATENT DOCUMENTS

WO WO2019006580 A1 1/2019

OTHER PUBLICATIONS

Extended European Search Report dated Jan. 21, 2022 for European Patent Application No. 21188111.5, 11 pages.

*Primary Examiner* — Un C Cho
*Assistant Examiner* — Yu-Wen Chang
(74) *Attorney, Agent, or Firm* — Lee & Hayes, P.C.

(57) ABSTRACT

A user equipment (UE) may perform multiple searches within a specified search period to locate the wireless band that provides the most throughput. For instance, if the UE finds a low band with time remaining in the search period, the UE continues to search for a higher frequency wireless. In some examples, the UE attempts to locate a high band within a next portion of the search period. If the UE finds the high band, then the UE will use that band since it provides the most throughput of the available bands. If the UE does not find the high band, then the UE searches for a mid-band for another portion of the search time. By prioritizing higher bands over the first available band that is located in the initial search, the UE will connect to the band that provides the best user experience and the most throughput.

15 Claims, 5 Drawing Sheets

(56) References Cited

U.S. PATENT DOCUMENTS

| | | | |
|---|---|---|---|
| 2021/0195475 A1* | 6/2021 | Youtz | H04W 36/0072 |
| 2021/0258729 A1* | 8/2021 | Huang | H04W 4/029 |
| 2021/0282126 A1* | 9/2021 | Lekutai | H04W 72/048 |
| 2021/0329466 A1* | 10/2021 | Khasnabish | H04W 16/14 |

\* cited by examiner

SELECTING WIRELESS BAND TO USE

BACKGROUND

Modern terrestrial telecommunication systems include heterogeneous mixtures of second, third, fourth generation, and fifth generation (2G, 3G, 4G, and 5G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, fifth generation (5G) cellular-wireless access technologies may be used to provide improved bandwidth and decreased response times to a multitude of devices that may be connected to a network. Selecting the wireless access technology and/or the wireless band to use to connect to user equipment (UE), however, can be challenging and may result in a decreased user experience. For example, selecting a wireless access technology and/or wireless band that has lower bandwidth compared to a different wireless access technology and/or wireless band that has higher bandwidth may provide a lower user experience.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
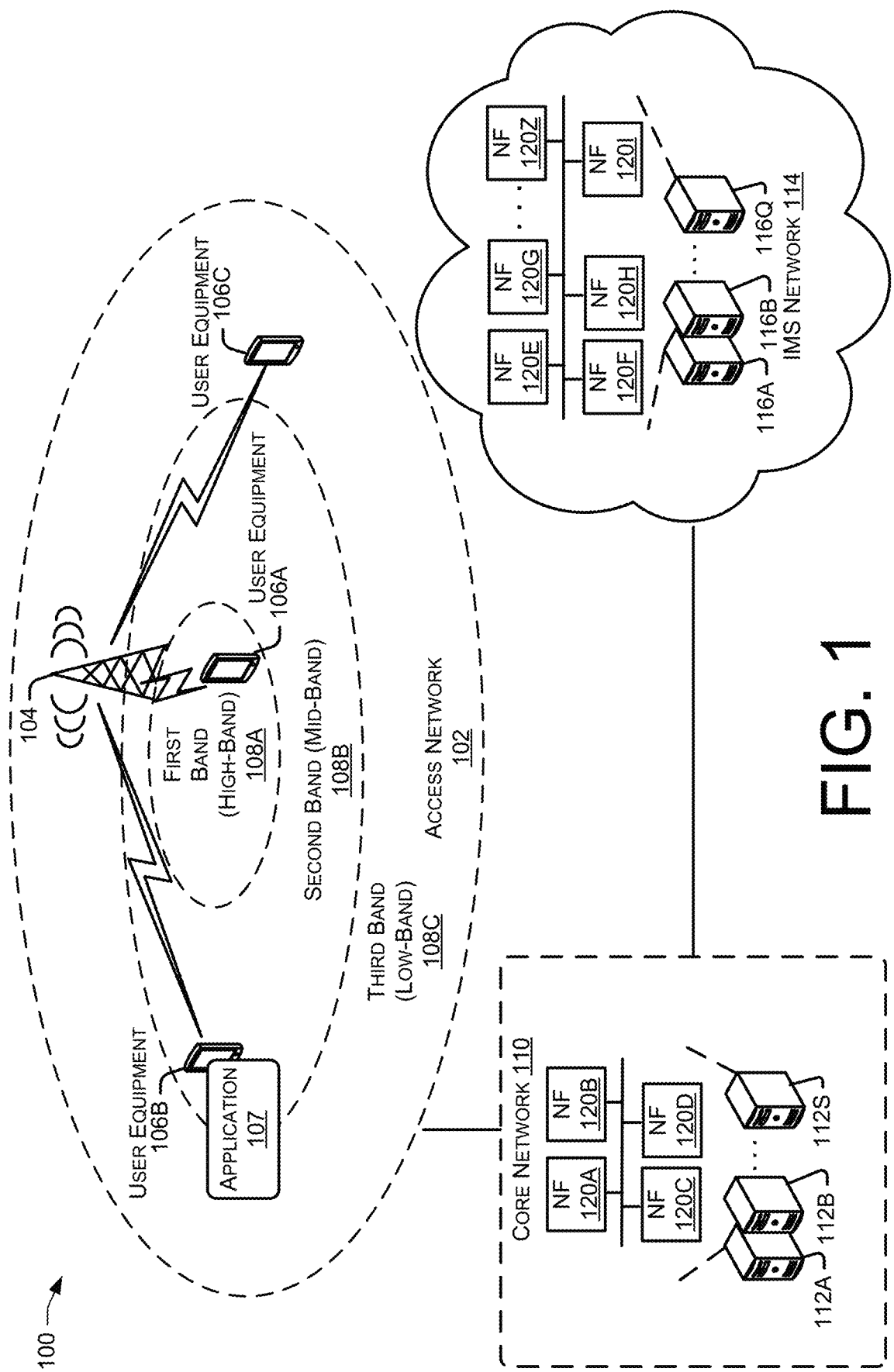
FIG. 1 is a block diagram showing an illustrative environment in which UE devices select a wireless band, from different wireless bands, to use within a telecommunications network.

Described herein are techniques and systems relating to selecting a wireless band for User Equipment (UE) to use within a telecommunications network. Using techniques described herein, UE within a telecommunications network may search and determine an availability of more than one wireless band for the UE to use for communication.

Today, UE perform a search to locate the first available wireless band. According to the 3rd Generation Partnership Project (3GPP) 5G NR non-standalone specification, a UE connects to the first wireless band that it finds. For example, if there is a low-band, a mid-band, and a high-band spectrum that is associated with a 5G network, but the UE performs a search and finds the low-band spectrum first, then the UE uses the low-band. Generally, low-band spectrum refers to 600 MHz, 800 MHz, and 900 MHz waves, the mid-band spectrum refers to 2.5 GHz, 3.5 GHz, and 3.7-4.2 GHz, the high-band spectrum (which may be referred to as "millimeter wave") refers to 24 GHz, 28 GHz, 37 GHz, 39 GHz, and 47 GHz. Other wavelengths may be associated with different bands. As used herein, the low-band has less bandwidth and throughput than the mid-band, and the mid-band has less bandwidth and throughput compared to the high-band.

Using techniques described herein, instead of using the first band that is located, the UE prioritizes higher bands that have larger bandwidth over lower bands that have lower bandwidth, such that even if a low band is found first, the UE will use a higher band if found. In this way, the UE uses a wireless band that has larger bandwidth and higher throughput compared to a lower frequency band. As such, the user experience is enhanced.

In some configurations, the UE performs multiple searches within a configurable specified search period to locate the wireless band that provides the most throughput. The search period may be any amount of time (e.g., 40 ms, 64 ms, 80 ms, 100 ms, 128 ms, 512 ms, . . . ) and may be specified by an authorized user associated with the telecommunications network. For instance, if search period is 60 ms, and the UE performs a search, the UE may find a low-band in the first 10 ms. Instead of connecting to the low band, however, the UE continues to search for a higher wireless band. In some examples, the UE attempts to locate a high-band for a next period of time (e.g., 20 ms). If the UE finds a high-band, then the UE will use the high-band since it provides the most throughput of the available bands. If the UE does not find the high band, then the UE searches for a mid-band for another portion of the search time (e.g., 20 ms). If the UE finds the mid-band, then the UE will use that band since it provides higher throughput than the already located low-band. If the UE does not find a mid-band, then the UE may search again for the low band for up to 10 ms to verify that the low-band is still available. By prioritizing higher bands over the first available band that is located in an initial search, the UE will connect to the wireless band that provides the best user experience and the most throughput.

The systems, devices, and techniques described herein can improve a functioning of a network by adjusting what wireless band is used by UE devices within a wireless network. In this way, users may have a better experience as the UE devices connect to wireless bands that may have better throughput compared to a first identified wireless band. For example, using the techniques described herein, instead of a UE connecting to a 600 MHz low-band, the UE may connect to 39 GHz, or some other high-band, or possibly a mid-band when a high-band is not available. In other examples, network conditions and/or network services used by the UE may be used to assist in determining what available band the UE may use. These and other improvements to the functioning of a computer and network are discussed herein. More details are provided below with reference to FIGS. 1-5.

FIG. 1 is a block diagram showing an illustrative environment 100 in which UE devices select a wireless band, from different wireless bands, to use within a telecommunications network. In some examples, the telecommunications network is a Non-Stand Alone (NSA) network that includes both 4G coverage and 5G coverage. In other examples, the telecommunications network may use other wireless access technologies. The environment 100 may include an access network 102, a core network (CN) 110, and an IMS network 114 that is associated with a wireless service provider(s).

The environment 100 is illustrated in simplified form and may include many more components. While 5G networks and 4G networks are discussed herein, the techniques may be applied to telecommunications networks that use networks that provide different levels of service and/or bandwidths (e.g., a first radio network having a bandwidth and data rate that is larger and higher compared to a second radio network).

The environment 100 may include cells, such as cell 104, that may be wireless or wired that are coupled to a core network 110 and/or some other network. The environment 100 may also include one or more access points (not shown), and one or more gateways (not shown). A cell, such as cell 104, may handle traffic and signals between electronic devices, such as the user equipment 106, and CN 110. For example, a cell 104 may perform the transcoding of speech channels, allocation of radio channels to electronic devices, paging, transmission and reception of voice and data, as well as other functions. A cell 104 may include several base transceiver stations (BTS), each BTS may include a transceiver, antenna, and additional network switch and control equipment that provide a network cell for facilitating wireless communication between UE computing devices and the core network 110 and/or other networks. In some examples, the cells, such as cell 104, may include a gNodeB and/or an eNodeB.

The user equipment 106 are computing devices that can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data using a cellular access network 102, and/or over a Wi-Fi network, or some other type of network. In some instances, the UE 106 computing devices can be configured to send and receive data using any wired or wireless protocols. Additional examples of the UE 106 include, but are not limited to, smart devices such as televisions, music players, or any other electronic appliances that can generate, request, receive, transmit, or exchange voice, video, and/or digital data over a network. In some examples, the UE 106 is configured to communicate with CN 110, and/or other cellular networks. The UE 106 can further be configured to establish or receive a communication session, such as a voice call, a video call, or another sort of communication.

In some configurations, one or more nodes, such as nodes 112 illustrated in CN 110 and/or nodes 116 illustrated in IMS network 114 may be configured as one or more application servers that provide support for one more applications, such as application 107 used by one or more computing devices, such as UE 106. Some example applications include, but are not limited to browser applications, messaging applications, voice applications (e.g., Voice over Internet Protocol "VoIP" applications), video applications, and the like.

While the nodes 112 are illustrated within the CN 110 and nodes 116 are illustrated in IMS network 114, one or more other computing devices may be located outside of these networks. For example, an application server, or some other server or device, may be connected to a network via one or more external packet switched networks, such as the Internet.

According to some configurations, a telephony client application, such as application 107, on the UE 106 may establish data communication with the network 110 through a data connection to the cell 104. The cell 104 may route a communication wired/wirelessly from the UE 106 through the access network 102 for communication to the CN 110. In general, a cell 104 can be implemented as a variety of technologies to provide wired and/or wireless access to the network, as discussed herein. In some instances, the cell 104 can include a New Radio (5G) RAN, a 3GPP RAN, such as a GSM/EDGE RAN (GERAN), a Universal Terrestrial RAN (UTRAN), an evolved UTRAN (E-UTRAN), or alternatively, a "non-3GPP" RAN, such as a Wi-Fi RAN, or another type of wireless local area network (WLAN) that is based on the IEEE 802.11 standards. Further, the cell 104 can include any number and type of transceivers and/or base stations representing any number and type of macrocells, microcells, picocells, or femtocells, for example, with any type or amount of overlapping coverage or mutually exclusive coverage. In the current example, the access network 102 illustrates the use of different 5G bands, including a high-band 108A, a mid-band 108B, and a low-band 108C. In other examples, the access network may include different 5G wireless bands 108, as well other bands associated with other wireless access networks (e.g., 3G, 4G LTE bands, . . . ).

When a communication request arrives at the network 110, one or more of the nodes 112 may determine the identity of the originating computing device for the communication (e.g., using a telephone number, IMEI, IMSI, IP address) as well as the identity of the computing devices to send the communication. In some configurations, one or more of the nodes 116 may be used to determine the identity of the originating computing device for the communication as well as the identity of the computing devices to send the communication. The one or more of the nodes 112, 116 may also identify that the UE 106 is communicating via 5G bands 108, and/or LTE bands 110, as well as a location of the UE 106 within the access network. The nodes 112/116 may also determine other information about the UE 106, such as direction of travel, velocity of the UE 106, and the like. For example, a node 112/116 may identify that UE 106A is within the area of 5G high-bands 108A but is moving toward (and will soon enter) the mid-band 108B. Similarly, UE 106B and UE 106C may be identified to be within an area of the access network 102 covered by one or more wireless bands 108. According to some configurations, a UE 106 may connect to the service nodes 112, or some other component such as an application server, via the Internet (not illustrated).

As illustrated, the environment 100 includes one or more servers, including nodes 112 and 116, to facilitate communications by and between the various devices in the environment 100 and perform operations relating to using the IMS network 114, and/or other networks. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, Evolved High-Speed Packet Access (HSPA+) are examples of 4G, and 5G NR is an example of 5G telecommunications technologies. Thus, the environment 100 may implement GSM, UMTS, LTE/LTE Advanced, and/or 5G NR telecommunications technologies. According to some configurations, the low-band spectrum refers to 600 MHz, 800 MHz, and 900 MHz waves, the mid-band spectrum refers to 2.5 GHz, 3.5 GHz, and 3.7-4.2 GHz, and the high-band spectrum refers to 24 GHz, 28 GHz, 37 GHz, 39 GHz, and 47 GHz waves. The high-bands 108A provide higher throughput and bandwidth compared to the mid-bands 108B. The mid-bands 108B provide higher throughput and bandwidth compared to the low-bands 108.

The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 106, and one or more endpoints within the environment 100 (e.g., nodes 112A-112S that provide network functions (NFs) 120A-120D, nodes 116A-116Q that provide NFs 120E-120I, websites, etc.). While FIG. 1 illustrates an example environment 100, it is understood in the context of this document, that the techniques discussed herein may also be implemented in other networking technologies.

The IMS network 114 may expose Network Functions (NFs), such as NFs 120E-120Z, to nodes within a CN, nodes within the IMS network, and/or nodes within some other network. As illustrated, the CN exposes NFs 120A-120D. Using the IMS network 114, a node, such as a node in the CN 110, can communicate with the IMS network 114. In some examples, the nodes may communicate using the Session Initiation Protocol (SIP) protocol, a HTTP/Representational State Transfer (REST) protocol, and/or some other protocol. According to some configurations, the nodes use a standard Application Programming Interface (API) to communicate.

As briefly discussed above, UEs 106, such as UE 106A, UE 106B, and UE 106C may search different available wireless bands of access network 102 to determine a wireless band to use instead of selecting the first wireless band that is located. Instead of a UE 106 connecting to the first wireless band that it finds according to the 3rd Generation Partnership Project (3GPP) 5G NR non-standalone specification, the UE prioritizes higher bands that are located from a search of more than one band. As an example, FIG. 1 illustrates a low-band 108C, a mid-band 108B, and a high-band 108A that is associated with a 5G network.

Using techniques described herein, instead of using the first band that is located (e.g., the low-band 108C and/or the mid-band 108B), the UE 106 prioritizes higher bands that have larger bandwidth over lower bands that have lower bandwidth, such that even if a low band is found first, the UE 106 will use a higher band if found.

In the current example, the UE 106A may perform different searches that indicate that low-band 108C, mid-band 108B, and high-band 108A are available for the UE 106A to use. The UE 106B may perform different searches that indicate that low-band 108C, and mid-band 108B are available, but that high-band 108A is unavailable for the UE 106B to use. The UE 106C may perform different searches that indicate that low-band 108C is available, but that mid-band 108B and high-band 108A are unavailable for the UE 106C to use. According to configurations described herein, the UE 106 may select the highest band even if that band is not located first. In this way, the UE uses a wireless band that has larger bandwidth and higher throughput compared to a lower frequency band. As such, the user experience is enhanced.

In some examples, the UE 106 performs multiple searches within a specified search period to locate the wireless band that provides the most throughput. For instance, if the search period is 60 ms, then the UE 106 may perform searches for different bands 108 using a portion of the search time. For instance, if the UE is to perform three searches, and the search period is 60 ms, then the UE 106 may perform a first search in a first portion of the search time, a second search in a second portion of the search time, and a third search in a third portion of the search time. As an example, the UE 106 may perform a first search for an available band 108 and find low-band 108C in the first 10-15 ms. Instead of connecting to low band 108C, however, the UE 106 continues to search for a higher wireless band using remaining time within the specified search period. In some examples, the UE 106 attempts to locate a high-band 108A for a next period of time (e.g., 20 ms, or some other value). If the UE 106 finds the high-band 108A, then the UE 106 may use the high-band 108A since the high-band 108A provides the most throughput of the available bands. If the UE 106 does not find the high-band 108A, then the UE 106 searches for the mid-band 108B for another portion of the search time (e.g., 20 ms, or some other time). If the UE 106 finds the mid-band 108B, then the UE 106 will use the mid-band 108B since it provides higher throughput than the already located low-band 108C. If the UE does not find the mid-band 108B, then the UE 106 may search again for the low-band (if time remains within the search period) to verify that the low-band 108C is still available. By prioritizing higher bands over the first available band that is located in an initial search, the UE 106 will connect to the wireless band that provides the best user experience and the most throughput.

According to some examples, the UE 106 may be provided with bands that may be available to it based on the location of the UE 106. For example, before starting to search for available bands 108, the UE 106 may be informed by a network component or device, such as provided by one or more of nodes 112A-112S. In this way, the UE 106 may perform a more targeted search instead of searching for bands 108 that may not be available to the UE 106 at a particular location. For instance, a node 112 may provide functionality that provides a UE 106 bands that are available within particular areas. As an example, UE 106A may be notified that high-band 108A, mid-band 108B, and low-band 108C may be available, whereas UE 106B may be notified that mid-band 108B, and low-band 108C may be available. More details are provided below with regard to FIGS. 2-5.

Figure 2:
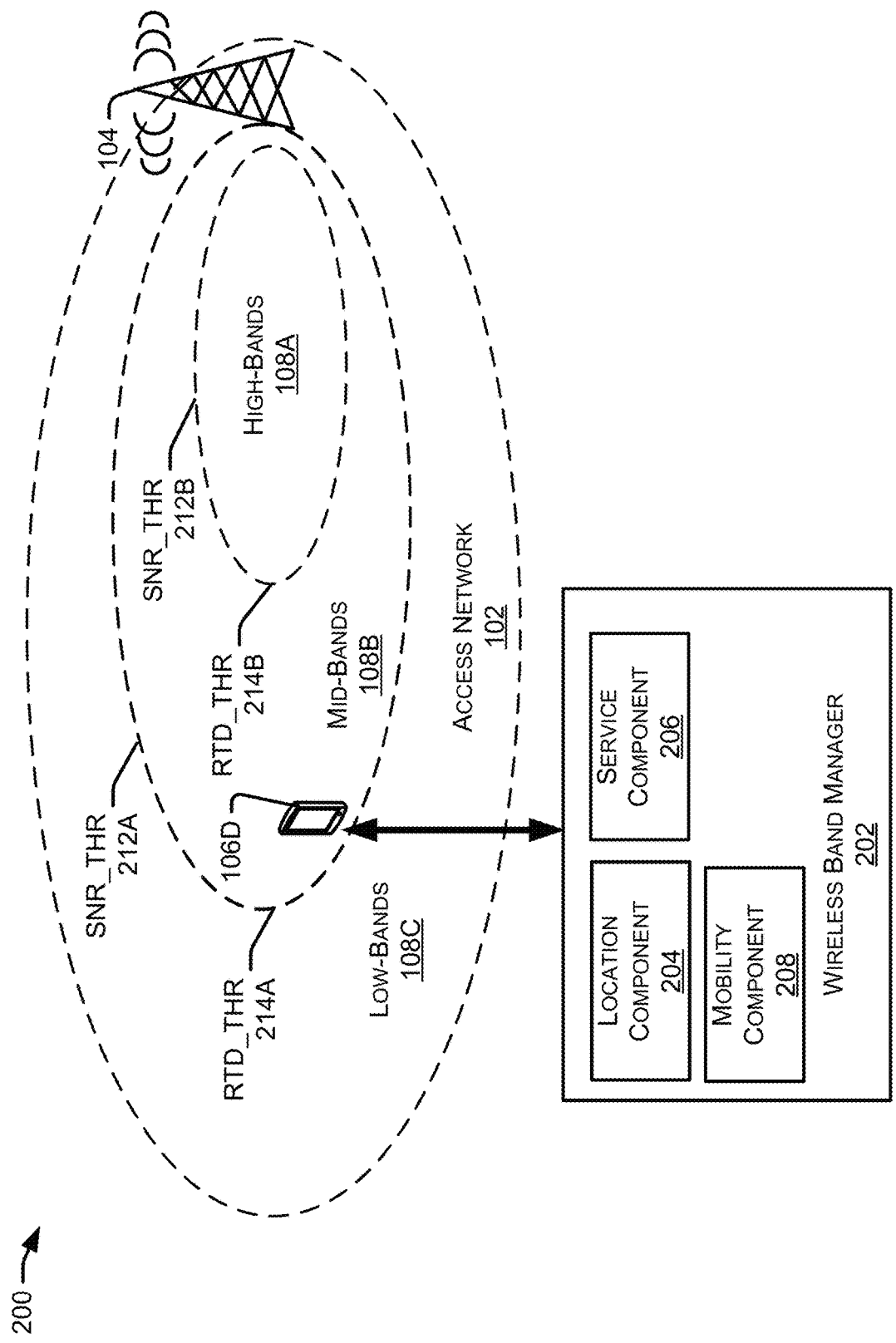
FIG. 2 is a block diagram showing an illustrative environment that includes a wireless band selection manager that may be used to select an available wireless band to connect to a UE within an telecommunications network.

FIG. 2 is a block diagram showing an illustrative environment 200 that that includes a wireless band selection manager that may be used to select an available wireless band to connect to a UE within an telecommunications network. The environment 200 illustrates additional details (compared to FIG. 1) on a UE 106 selecting a wireless band 108 within a telecommunications network.

As discussed briefly above, in some systems when a UE 106 is selecting a wireless band 108 to use, the UE 106, such as UE 106D, searches for available wireless bands 108 instead of selecting the first located band 108.

In some configurations, a wireless band manager 202 provides functionality that may be used to assist a UE 106 in selecting a wireless band 108 to use within the access network 102. The wireless band manager 202 may communicate with UEs 106, such as UE 106D, to assist the UE 106 in searching for and selecting an available wireless band 108. As illustrated, the wireless band manager 202 includes a location component 204, a service component 206, and a mobility component 208.

In some configurations, the wireless band manager 202 may use a service component 206 to identify the services used by the UE devices 106, such as UE 106D. For example, wireless band manager 202 may determine if UE 106D is accessing one or more services that use high bandwidth and/or lower bandwidths. In some examples, the services used by the UE 106 may be taken into account when providing a list of bands 108 that may be available to the UE 106D. For instance, if the telecommunications network is in a heavily loaded condition, and the UE 106D is not using a service that is dependent upon high bandwidth, the wireless band manager 202 may exclude the high-band 108A and/or the mid-band 108B as a possible band. In other examples, the wireless band manager 202 may not factor the services into account when providing the list of possible bands 108 that may be available to the UE 106D.

According to some examples, the wireless band manager 202 may determine different metrics within the access network 102 to assist in determining what bands 108 to provide to the UE 106D to search for. For instance, the wireless band manager 202 may determine RF metrics and RTD (Round Trip Delay) values to determine whether or not a UE 106 is moving within the telecommunications network (e.g., moving from coverage in low-bands 108C to mid-band 108B, moving from high-bands 108A to mid-bands 108B, and the like). The wireless band manager 202 may also determine the load of the different systems (e.g., 5G, 4G LTE) within the telecommunications network.

The wireless band manager 202 may also determine the speed of the UE devices 106. For examples, the mobility component 208 may determine the speed and direction of travel of UE 106D using a location-based service, GPS, radar, RTD, RF condition, and the like. In the current example, the wireless band manager 202 uses the location component 204 to determine the location of the UE devices 106 within the access network 102, the mobility component 208 to determine a speed and/or direction of travel of the UE devices within the access network 102, and the service component 206 to determine the services used by the UE devices 106.

As discussed above, the wireless band manager 202 may identify the UE devices 106 that are within the access network 102. In some configurations, the location component 204 may determine if the RTD between bands 108B (RTD_THR 214A) and the high-band 108A (RTD_THR 214B) and determine if the signal to noise ratio (SNR) of SNR 212A is less than SNR_212B to determine if the UE 106D is within a particular band 108.

After determining a location of a UE 106, the wireless band manager 202 may use the location component 204 and/or the mobility component 208 to determine whether the UE 106 is moving within the access network 102, the direction of travel, the speed of travel, and the like. For instance, the wireless band manager 202 may use this information to determine if UE 106D is moving out one band 108 into another band or staying within a particular band 108. As briefly discussed above, the wireless band manager 202 may use the location information and other data received from the mobility component 208 and/or the service component 206 to determine an identification of the bands 108 to send to the UE 106D to search for availability. In the current example, the wireless band manager 202 may provide the UE 106D to search for mid-bands 108B, and low-bands 108C since the location of UE 106D appears to be outside of the area of high-bands 108A.

Figure 3:
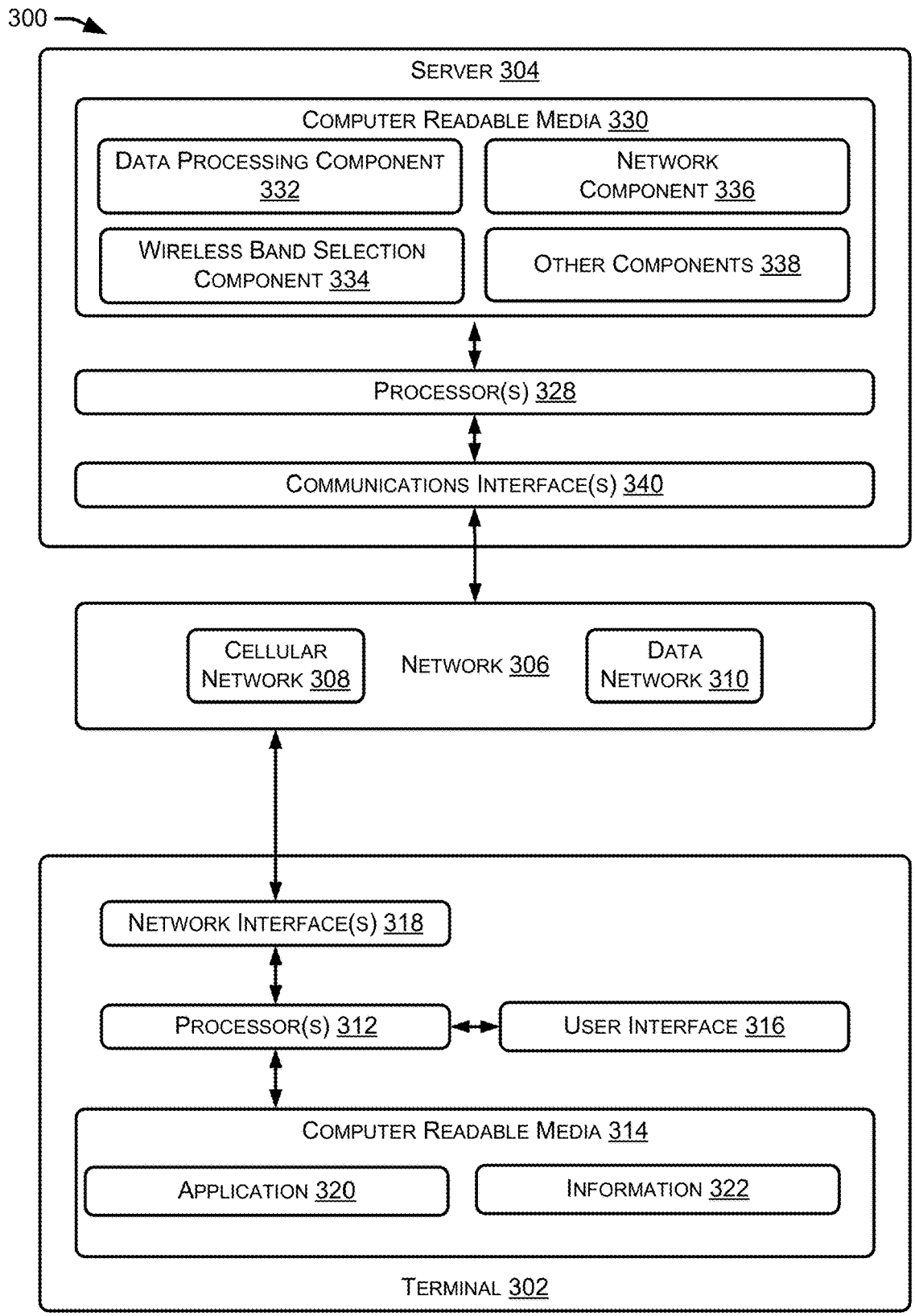
FIG. 3 is a block diagram illustrating a system that includes one or more components for scanning for and selecting a wireless band to connect to a UE within an telecommunications network.

FIG. 3 is a block diagram illustrating a system 300 that includes one or more components for one or more components for scanning for and selecting a wireless band to connect to a UE 106 within an telecommunications network, according to some implementations. The system 300 includes a terminal 302, which can represent a UE 106, or another computing device, coupled to a server 304, via a network 306. The server 304 can represent a computing device, such as one or more of the servers within the access network 102, the CN 110, IMS network 114, and/or some other computing device. The network 306 can represent network 110, 114, and/or access network 102, or some other network.

The network 306 can include one or more networks, such as a cellular network 308 and a data network 310. The network 306 can include one or more core network(s) connected to terminal(s) via one or more access network(s). Example access networks include LTE, WIFI, GSM Enhanced Data Rates for GSM Evolution (EDGE) Radio Access Network (GERAN), UTRAN, and other cellular access networks. Message transmission, reception, fallback, and deduplication as described herein can be performed, e.g., via 3G, 4G, 5G, WIFI, or other networks.

The cellular network 308 can provide wide-area wireless coverage using one or more technologies such as GSM, Code Division Multiple Access (CDMA), UMTS, LTE, NR, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 304 and terminals such as the terminal 302 can additionally or alternatively be performed using other technologies, such as wired (Plain Old Telephone Service, POTS, or PSTN lines), optical (e.g., Synchronous Optical NETwork, SONET) technologies, and the like.

The data network 310 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the server 304 includes or is communicatively connected with an IWF or other device bridging networks, e.g., LTE, 3G, and POTS networks. In some examples, the server 304 can bridge SS7 traffic from the PSTN into the network 306, e.g., permitting PSTN customers to place calls to cellular customers and vice versa.

In some examples, the cellular network 308 and the data network 310 can carry voice or data. For example, the data network 310 can carry voice traffic using VoIP or other technologies as well as data traffic, or the cellular network 308 can carry data packets using HSPA, LTE, or other technologies as well as voice traffic. Some cellular networks 308 carry both data and voice in a PS format. For example, many LTE networks carry voice traffic in data packets according to the VoLTE standard. Various examples herein provide origination and termination of, e.g., carrier-grade voice calls on, e.g., networks 306 using CS transports or mixed VoLTE/5G transports, or on terminals 302 including OEM handsets and non-OEM handsets.

The terminal 302 can be or include a wireless phone, a wired phone, a tablet computer, a laptop computer, a wristwatch, or other type of terminal. The terminal 302 can include one or more processors 312, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 314, such as memory (e.g., random access memory (RAM), solid state drives (SSDs), or the like), disk drives (e.g., platter-based hard drives), another type of computer-readable media, or any combination thereof. The CRM or other memory of terminal 302 can hold a datastore, e.g., an SQL or NoSQL database, a graph database, a BLOB, or another collection of data. The terminal 302 can further include a user interface (UI) 316, e.g., including an electronic display device, a speaker, a vibration unit, a touchscreen, or other devices for presenting information to a user and receiving commands from the user. The terminal 302 can further include one or more network interface(s) 318 configured to selectively communicate (wired or wirelessly) via the network 306, e.g., via an access network 122.

The CRM 314 can be used to store data and to store instructions that are executable by the processors 312 to perform various functions as described herein. The CRM 314 can store various types of instructions and data, such as an operating system, device drivers, etc. The processor-executable instructions can be executed by the processors 312 to perform the various functions described herein.

The CRM 314 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 312. Tangible computer-readable media can include volatile and nonvolatile, removable and non-removable media implemented in any method or technology for storage of information, such as computer readable instructions, data structures, program components, or other data.

The CRM 314 can include processor-executable instructions of an application 320. The CRM 314 can store information 322 identifying the terminal 302. The information 322 can include, e.g., an IMEI, an IMSI identifying the subscriber using terminal 302, or other information discussed above. The CRM 314 can additionally or alternatively store credentials (omitted for brevity) used for access, e.g., to IMS or RCS services.

The server 304 can include one or more processors 328 and one or more CRM 330. The CRM 330 can be used to store processor-executable instructions of a data processing component 332, a wireless band selection component 334 which may be configured to search for and select a wireless band 108 for a UE 106, such as terminal 302, to use. The processor-executable instructions can be executed by the one or more processors 328 to perform various functions described herein.

In some examples, server 304 can communicate with (e.g., is communicatively connectable with) terminal 302 or other devices via one or more communications interface(s) 340, e.g., network transceivers for wired or wireless networks, or memory interfaces. Example communications interface(s) 340 can include ETHERNET or FIBRE CHANNEL transceivers, WIFI radios, or DDR memory-bus controllers (e.g., for DMA transfers to a network card installed in a physical server 304).

In some examples, processor 312 and, if required, CRM 314, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 328 and, if required, CRM 330.

Figure 4:
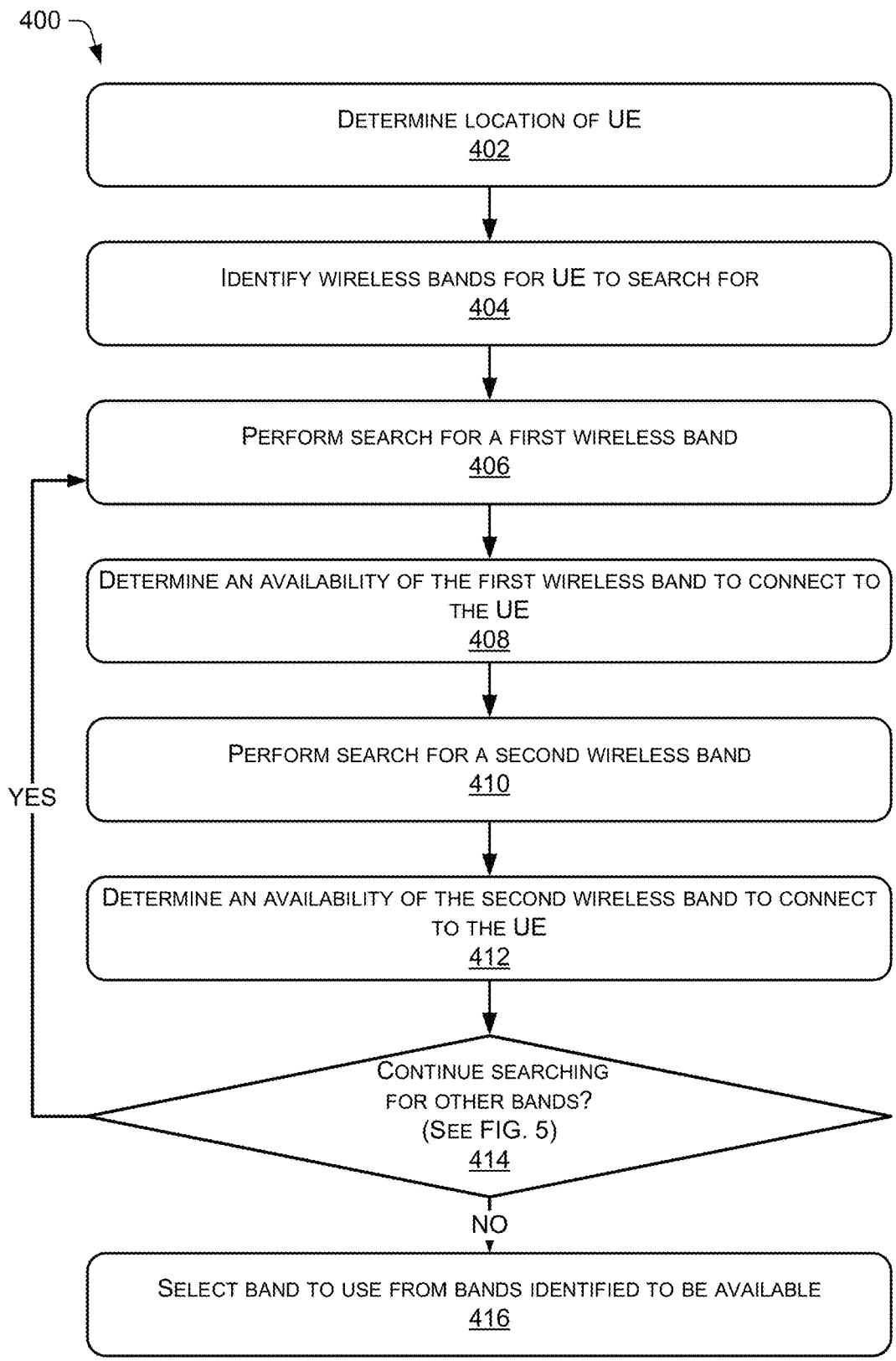
FIG. 4 is a flow diagram of an example process that includes selecting an available wireless band to connect to a UE after performing a search for available wireless bands, according to some implementations.
Figure 5:
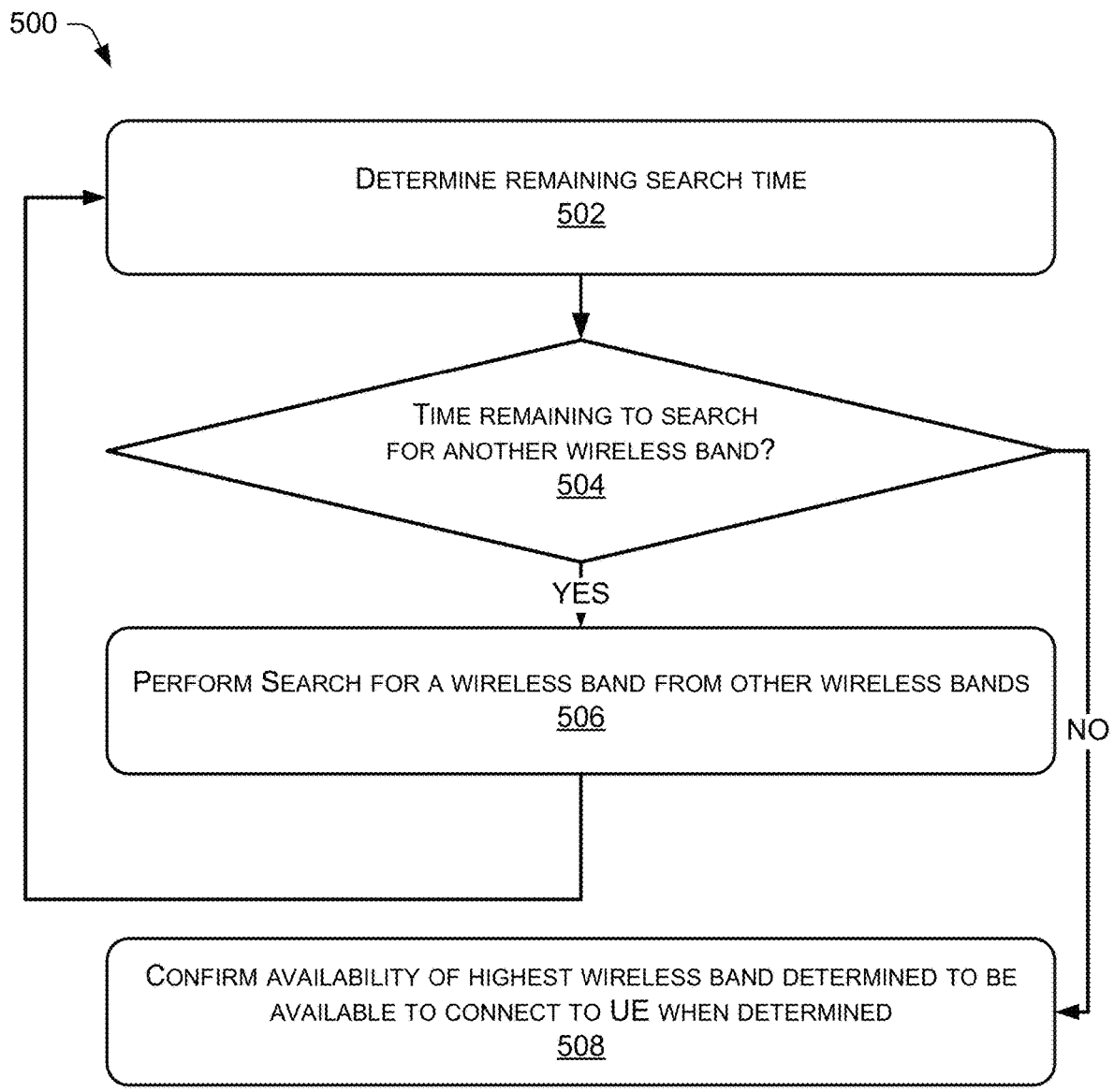
FIG. 5 is a flow diagram of an example process that includes determining whether to continue searching for available wireless bands to connect to a UE, according to some implementations.

FIGS. 4 and 5 illustrate example processes. The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 illustrates an example process that includes selecting an available wireless band 108 to connect to a UE 106 after performing a search for available wireless bands, according to some implementations.

The process 400 includes, at 402, determining a location of a UE 106. As discussed above, the wireless band manager 202, or some other device or component, may determine the location of the UE 106. According to some examples, the location may be determined using one or more of a location-based service, GPS, radar, RTD, RF condition, and the like.

At 404, the wireless bands 108 to search for may be identified. As discussed above, the wireless band manager 202 and/or some other device or component may use the location of the UE 106 to determine the bands 108 that may be available to the UE 106. For example, if a UE 106 is in a location of the access network 102 that includes high-bands 108A, then the UE 106 may be provided with a list of all of the available bands 108. When the UE 106 is located in an area in which high-bands 108A are not available, the UE 106 may be informed to not search for high-bands 108A.

At 406, a search for a first wireless band is performed. As discussed above, the UE 106 may perform a search for a first available wireless band 108 from different available bands. According to some examples, the UE 106 uses a portion of an available search time to search for the first wireless band. For instance, if the search period is 60 ms, and there are three bands to search, the UE 106 may spend 10-20 ms searching for the first wireless band 108. When there are two possible available wireless bands 108 to search, then the UE 106 may spend more time (e.g., 30 ms) to search for the first wireless band.

At 408, an availability of the first wireless band 108 to connect to the UE 106 is determined. As discussed above, the search for a particular wireless band (e.g., high-band 108A, mid-band 108B, low-band 108C, . . . ) may indicate that the band 108 is available for connection and/or not available for connection.

At 410, a search for a second wireless band is performed. As discussed above, the UE 106 may perform a search for a second available wireless band 108 from different available bands. According to some examples, the UE 106 uses a portion of the remaining search time to search for the second wireless band. For instance, if the search period is 60 ms, and 20 ms was spent during the search for the first wireless band, then the UE 106 may spend 10-20 ms searching for the second wireless band 108. In some instances, the UE 106 searches for the highest band 108A that may be available to the UE 106 during the search for the second wireless band.

At 412, an availability of the second wireless band 108 to connect to the UE 106 is determined. As discussed above, the search for a particular wireless band (e.g., high-band 108A, mid-band 108B, low-band 108C, . . . ) may indicate that the band 108 is available for connection and/or not available for connection.

At 414, a decision is made as to whether to continue searching for other wireless bands 108. Generally, if there are other bands available to search and time remains within a search period, then the UE 106 continues to search for other bands 108 that may be available (See FIG. 5 for more details). When it is determined to search for other bands 108, the process returns to 406. When it is determined to not search for other bands 108, the process flows to 414.

At 416, the band to use from bands 108 identified to be available is selected. As discussed above, the UE 106 may select the wireless band 108 that is available to the UE 106 that has the highest bandwidth and/or throughput.

FIG. 5 illustrates an example process that includes determining whether to continue searching for available wireless bands to connect to a UE, according to some implementations.

The process 500 includes, at 502, determining a remaining search time. As discussed above, in some examples, the UE 106 may use a search period to perform searches for different available wireless bands 108.

At 504, a determination is made as to whether there is time remaining to search for another wireless band 108. In some examples, the wireless band manager 202, or some other device or component, may specify a search time that the UE 106 may search for wireless bands 108. As discussed above, searching for a wireless band 108 takes some time to complete. As such, after searching for a wireless band 108 for a specified period of time, a portion of the available search period has been used. When there is no more remaining time to search, or when there is not enough time to complete a search in the remaining time, the process 500 flows to 508. When there is remaining time to search, the process 500 flows to 506.

At 506, a search for another wireless band 108 may be performed. As discussed above, the UE 106 may spend up to a specified period of time when searching for an available wireless band 108.

At 508, the availability of the highest wireless band 108 may be confirmed when determined. As discussed above, the UE 106 may identify one or more available wireless bands 108.

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A system comprising:
one or more processors;
at least one memory; and
one or more components stored in the at least one memory and executable by the one or more processors to perform operations comprising:
determining a location of a user equipment (UE);
receiving a list of a plurality of wireless bands associated with a wireless access network based on the location;
searching, by the UE, for a first wireless band from the list of the plurality of wireless bands that includes at least the first wireless band and a second wireless band, wherein the first wireless band is associated with a first bandwidth of the wireless access network and the second wireless band is associated with a second bandwidth of the wireless access network that is larger than the first bandwidth;
determining that the first wireless band is available to connect to the UE;
searching, by the UE, for the second wireless band;
determining an availability of the second wireless band to connect to the UE;
determining that the second wireless band is unavailable to connect to the UE;
searching, by the UE, for a third wireless band, wherein the third wireless band is associated with a third bandwidth that is smaller than the second bandwidth and larger than the first bandwidth;
determining an availability of the third wireless band to connect to the UE;
selecting a wireless band from the list of the plurality of wireless bands to use to connect to the UE based at least in part on the availability of the second wireless band and the third wireless band; and
causing the UE to connect to the wireless band.

2. The system of claim 1, wherein the wireless access network is a fifth-generation wireless access network.

3. The system of claim 1, wherein searching for the first wireless band and the second wireless band is completed within a predetermined search time.

4. The system of claim 1, further comprising:
determining that the third wireless band is unavailable to connect to the UE, and
wherein selecting the wireless band comprises selecting the first wireless band to connect to the UE.

5. The system of claim 1, wherein selecting the wireless band from the list of the plurality of the wireless bands to use to connect to the UE based at least in part on the availability of the second wireless band comprises selecting the first wireless band as the wireless band in response to determining that one or more of the second wireless band and the third wireless band are unavailable.

6. A computer-implemented method comprising:
determining a location of a user equipment (UE);

receiving a list of a plurality of wireless bands associated with a wireless access network based on the location;
searching, by the UE, for a first wireless band from the list of the plurality of wireless bands that includes at least the first wireless band and a second wireless band, wherein the first wireless band is associated with a first bandwidth of the wireless access network and the second wireless band is associated with a second bandwidth of the wireless access network that is larger than the first bandwidth;
determining an availability of the first wireless band to connect to the UE;
searching, by the UE, for the second wireless band;
determining an availability of the second wireless band to connect to the UE;
determining that the first wireless band is available to connect to the UE;
determining that the second wireless band is unavailable to connect to the UE;
searching, by the UE, for a third wireless band, wherein the third wireless band is associated with a third bandwidth that is smaller than a second bandwidth associated with the second wireless band and larger than a first bandwidth associated with the first wireless band;
determining an availability of the third wireless band to connect to the UE;
selecting a wireless band from the list of the plurality of wireless bands to use to connect to the UE based at least in part on the availability of the first wireless band, the second wireless band, and the third wireless band; and
causing the UE to connect to the wireless band.

7. The computer-implemented method of claim 6, wherein the wireless access network is a fifth-generation wireless access network.

8. The computer-implemented method of claim 6, wherein searching for the first wireless band and the second wireless band is completed within a predetermined search time.

9. The computer-implemented method of claim 6, further comprising:
determining that the third wireless band is unavailable to connect to the UE, and
wherein selecting the wireless band comprises selecting the first wireless band to connect to the UE.

10. The computer-implemented method of claim 6, wherein selecting the wireless band from the list of the plurality of the wireless bands to use to connect to the UE comprises selecting the first wireless band as the wireless band in response to determining that one or more of the second wireless band and the third wireless band are unavailable.

11. A non-transitory computer-readable medium storing instructions that, when executed, cause one or more processors to perform operations, comprising:
determining a location of a user equipment (UE);
receiving a list of a plurality of wireless bands associated with a wireless access network based on the location;
searching, by the UE, for a first wireless band from the list of the plurality of wireless bands that includes at least the first wireless band and a second wireless band, wherein the first wireless band is associated with a first bandwidth of the wireless access network and the second wireless band is associated with a second bandwidth of the wireless access network that is larger than the first bandwidth;
determining that the first wireless band is available to connect to the UE;
searching, by the UE, for the second wireless band;
determining an availability of the second wireless band to connect to the UE;
determining that the second wireless band is unavailable to connect to the UE;
searching, by the UE, for a third wireless band, wherein the third wireless band is associated with a third bandwidth that is smaller than the second bandwidth and larger than the first bandwidth;
determining an availability of the third wireless band to connect to the UE;
selecting a wireless band from the list of the plurality of wireless bands to use to connect to the UE based at least in part on the availability of the second wireless band and the third wireless band; and
causing the UE to connect to the wireless band.

12. The non-transitory computer-readable medium of claim 11, wherein the wireless access network is a fifth-generation wireless access network.

13. The non-transitory computer-readable medium of claim 11, wherein searching for the first wireless band and the second wireless band is completed within a predetermined search time.

14. The non-transitory computer-readable medium of claim 11, further comprising:
determining that the third wireless band is unavailable to connect to the UE, and
wherein selecting the wireless band comprises selecting the first wireless band to connect to the UE.

15. The non-transitory computer-readable medium of claim 11, wherein selecting the wireless band from the list of the plurality of wireless bands to use to connect to the UE based at least in part on the availability of the second wireless band comprises selecting the first wireless band as the wireless band in response to determining that one or more of the second wireless band and a third wireless band are unavailable.

* * * * *